Figure 1:
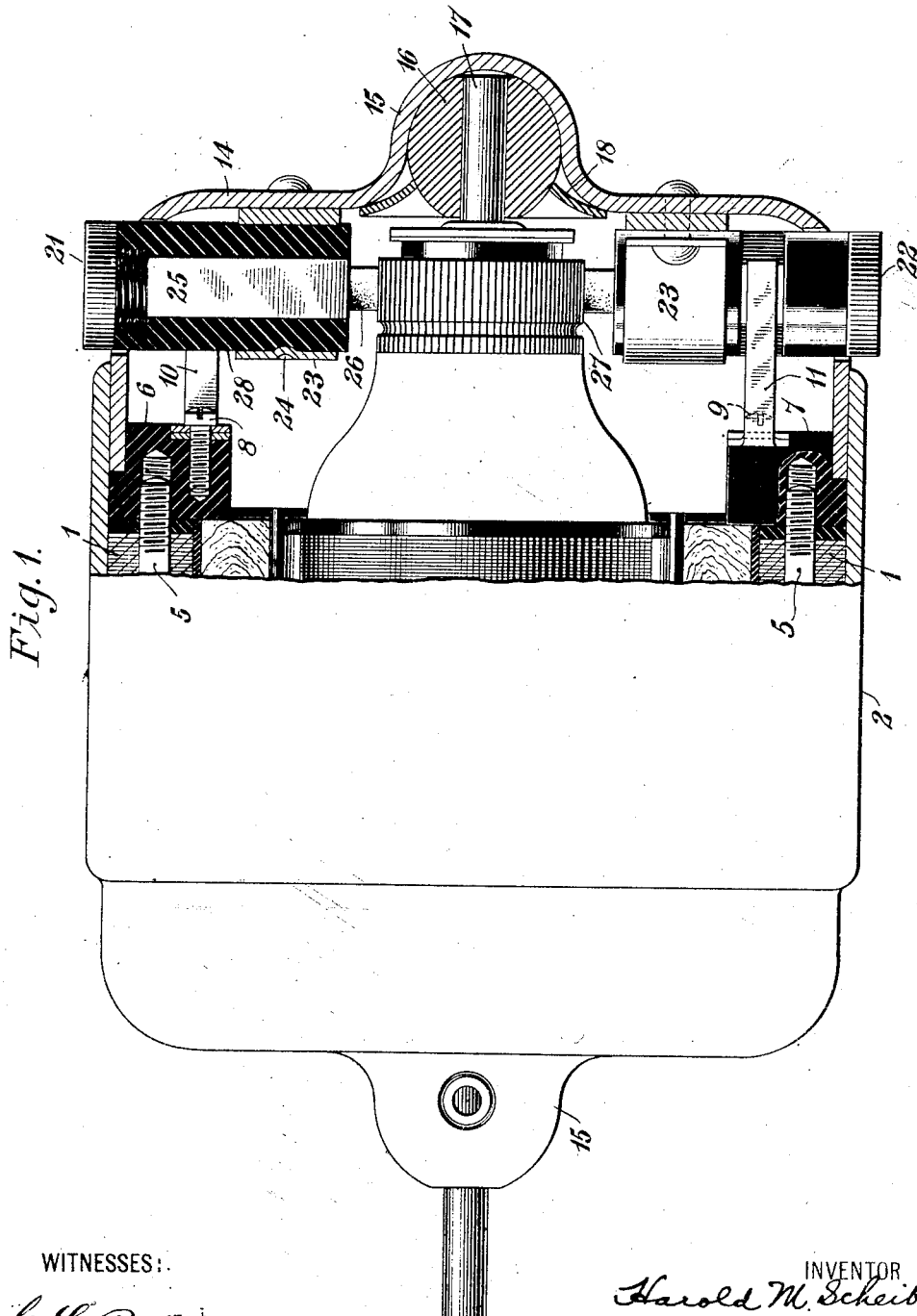

H. M. SCHEIBE.
DYNAMO ELECTRIC MACHINE.
APPLICATION FILED JAN. 10, 1908. RENEWED MAY 19, 1909.

928,799.

Patented July 20, 1909.

2 SHEETS—SHEET 1.

WITNESSES:
C. L. Belcher
Otto J. Schairer

INVENTOR
Harold M. Scheibe
BY
ATTORNEY

H. M. SCHEIBE.
DYNAMO ELECTRIC MACHINE.
APPLICATION FILED JAN. 10, 1908. RENEWED MAY 19, 1909.
928,799.
Patented July 20, 1909.
2 SHEETS—SHEET 2.
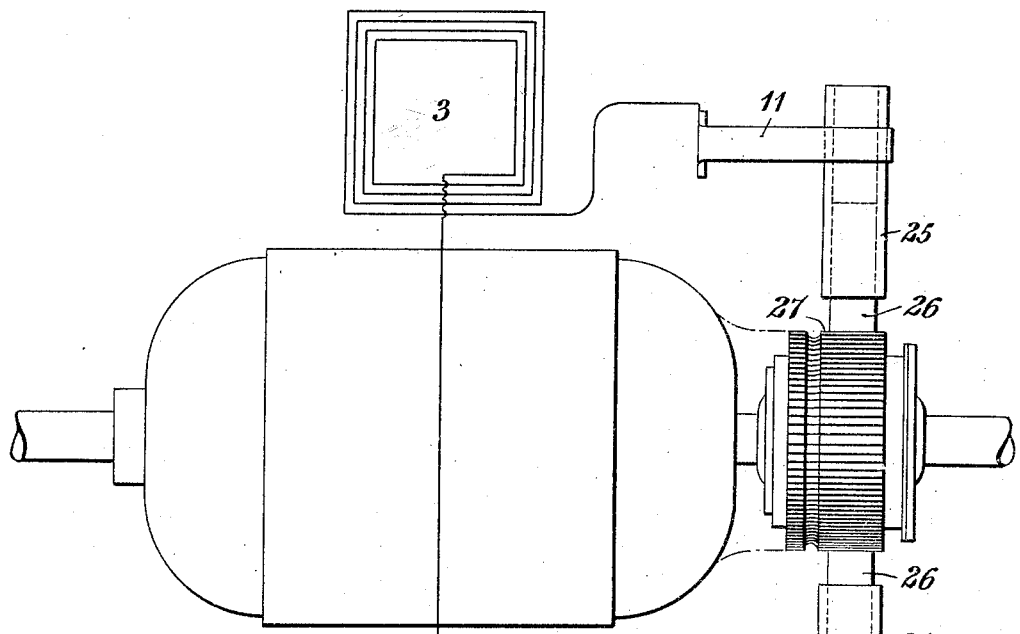
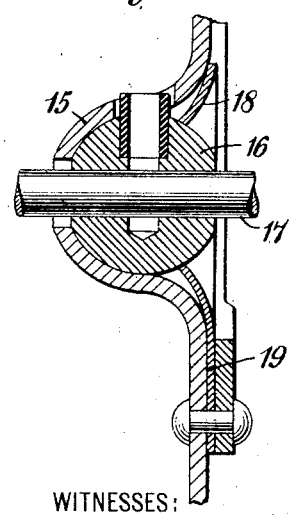
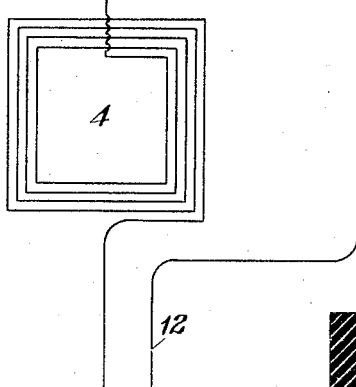
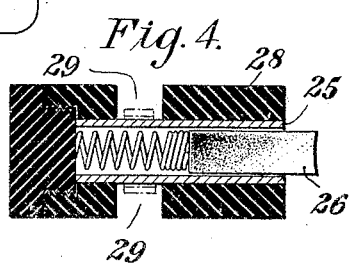
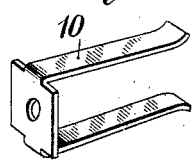
WITNESSES:
C. L. Belcher
Otto S. Schairer
INVENTOR
Harold M. Scheibe
BY
Wesley G. Carr
ATTORNEY

UNITED STATES PATENT OFFICE.

HAROLD M. SCHEIBE, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

DYNAMO-ELECTRIC MACHINE.

No. 928,799.     Specification of Letters Patent.     Patented July 20, 1909.

Application filed January 10, 1908, Serial No. 410,250. Renewed May 19, 1909. Serial No. 497,109.

*To all whom it may concern:*

Be it known that I, HAROLD M. SCHEIBE, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines, and it has for its object to provide such a structure and arrangement of the parts of a machine that it may be readily assembled and dismantled without disturbing permanent connections upon the interior thereof.

Figure 1 of the accompanying drawings is a view, partially in plan and partially in section, of a machine constructed in accordance with my invention. Fig. 2 is a diagrammatic view illustrating the circuit connections of the machine. Fig. 3 is a vertical sectional view, through one of the bearings. Fig. 4 is a transverse sectional view through one of the brush holders, and Fig. 5 is a perspective view of one of the parts of the machine.

The machine comprises a laminated field magnet core 1 that is inclosed and supported by a closely fitting sheet-metal casing 2 and is provided with a winding comprising two series-connected coils 3 and 4. Projecting entirely through the core structure are bolts 5 upon the projecting ends of which insulating blocks 6 and 7 are screwed. Secured, by means of screws 8 and 9, to the insulating blocks 6 and 7 are resilient U-shaped clips 10 and 11 that constitute the terminals of the motor parts contained within the casing 2. Terminal clip 10 is connected to a terminal lead 12 of the machine, and terminal clip 11 is connected to one extremity of the field magnet winding, the other extremity of the field magnet winding constituting one of the terminal leads of the machine.

The end walls of the casing 2 and a cover 14 therefor are provided with central external protuberances 15 that form substantially hemi-spherical sockets or recesses for the reception of spherical bearing sleeves 16 for a shaft 17 upon which the rotatable member of the machine is mounted. The bearing sleeves are resiliently clamped in their sockets by means of convex washers 18 having extensions 19 secured to the end walls of the casing.

Brush holders 21 and 22 of the machine are clamped to the end wall of the cover by means of clips 23, the brush holders projecting through apertures in the said cover and being prevented from rotation by means of protuberances 24 upon the clips that register with corresponding recesses in the brush holders. Each of the brush holders comprises a metallic sleeve or tube 25 in which operates a brush 26 that bears upon a commutator cylinder 27 and an insulating sleeve 28 that surrounds the said metallic sleeve and is slotted upon opposite sides at 29 to expose the metallic sleeve. When the cover 14 is applied to the casing 2, the U-shaped clips or terminal devices 10 and 11 project into the slots in the insulating sleeves 28 and clamp upon the metallic sleeves 25, the brush holders being in this manner connected to the terminals of the motor parts contained within the casing 2. This structure obviates the necessity of manually connecting and disconnecting the brush holders to and from the other parts of the machine before applying or after removing the cover 14, and thus renders the machine susceptible of very ready assembling or dismantling for inspection and repairs.

I claim as my invention:

1. In a dynamo-electric machine, the combination with a casing having separable parts, and field magnet and armature structures within the casing, of terminal devices supported by the field magnet structure and electrically connected, respectively, to a terminal of the field magnet winding and to a terminal of the machine, and brush holders carried by one part of the casing and adapted to be engaged by the said terminal devices.

2. In a dynamo-electric machine, the combination with a casing having separable parts, of stationary and rotatable members within the casing, terminal devices secured to but insulated from the stationary member, and brush holders carried by one part of the casing and adapted to be engaged, respectively, by the said terminal devices.

3. In a dynamo-electric machine, the combination with a stationary member, and terminal devices supported thereby, of an end bracket, and brush holders carried thereby and adapted to be engaged by the said terminal devices.

In testimony whereof, I have hereunto subscribed my name this 28th day of Dec., 1907.

HAROLD M. SCHEIBE.

Witnesses:
  F. D. HALLOCK,
  BIRNEY HINES.